(12) United States Patent
Erlandsson et al.

(10) Patent No.: US 11,014,425 B2
(45) Date of Patent: May 25, 2021

(54) VEHICLE CONDENSER

(71) Applicant: TitanX Holding AB, Sölvesborg (SE)

(72) Inventors: Olof Erlandsson, Bräkne-Hoby (SE); Thomas Skåre, Tingsryd (SE); Arnaud Contet, Sölvesborg (SE)

(73) Assignee: TITANX HOLDING AB, Sölvesborg (SE)

( * ) Notice: Subject to any disclaimer, the term of this patent is extended or adjusted under 35 U.S.C. 154(b) by 0 days.

(21) Appl. No.: 16/766,933

(22) PCT Filed: Oct. 5, 2018

(86) PCT No.: PCT/EP2018/077173
§ 371 (c)(1),
(2) Date: May 26, 2020

(87) PCT Pub. No.: WO2019/101441
PCT Pub. Date: May 31, 2019

(65) Prior Publication Data
US 2020/0369110 A1 Nov. 26, 2020

(30) Foreign Application Priority Data
Nov. 24, 2017 (EP) .................................... 17203598

(51) Int. Cl.
*B60H 1/00* (2006.01)
*F25B 39/04* (2006.01)
*F28D 9/00* (2006.01)

(52) U.S. Cl.
CPC ......... *B60H 1/00328* (2013.01); *F25B 39/04* (2013.01); *F28D 9/0093* (2013.01)

(58) Field of Classification Search
CPC .... B60H 1/00328; F28D 9/0093; F25B 39/04
See application file for complete search history.

(56) References Cited

U.S. PATENT DOCUMENTS 3,334,399 A * 8/1967 Teeguarden .......... F28D 9/0075
29/890.039
3,963,466 A * 6/1976 Hynes .................. B01D 53/265
55/434.4

(Continued)

FOREIGN PATENT DOCUMENTS

| DE | 10024889 A1 | | 11/2001 |
|----|----|----|----|
| EP | 2 843 324 | * | 3/2015 |
| WO | 2010078722 A1 | | 7/2010 |

OTHER PUBLICATIONS

International Search Report from International Application No. PCT/EP2018/077173, dated Dec. 14, 2018.

*Primary Examiner* — Ljiljana V. Ciric
(74) *Attorney, Agent, or Firm* — Brundidge & Stanger, P.C.

(57) ABSTRACT

A vehicle condenser which has a substantially parallelepipedic shape and stacked plates, which are parallel to a substantially vertical plane and define alternate coolant chambers and refrigerant chambers between each other. The vehicle condenser is divided into three consecutive groups of refrigerant chambers and includes at least one combination, on one side of the vehicle condenser, of a larger refrigerant outlet, that leads a main flow of refrigerant from one group of refrigerant chambers to a larger refrigerant inlet of a following group of refrigerant chambers, and, vertically opposite to the larger refrigerant outlet, a smaller refrigerant outlet, that leads a residual flow of refrigerant from the one group of refrigerant chambers to a smaller refrigerant inlet of the following group of refrigerant chambers.

19 Claims, 5 Drawing Sheets

(56) References Cited

U.S. PATENT DOCUMENTS

| | | | | |
|---|---|---|---|---|
| 4,027,729 | A * | 6/1977 | Bruhl | B01D 53/26 165/111 |
| 4,186,495 | A * | 2/1980 | Remberg | B01D 5/0006 165/140 |
| 4,600,050 | A * | 7/1986 | Noren | H05K 7/20609 165/104.14 |
| 4,763,488 | A * | 8/1988 | Johnston | B01D 1/221 159/28.6 |
| 4,769,113 | A * | 9/1988 | Sears | B01D 1/221 159/24.2 |
| 4,821,531 | A * | 4/1989 | Yamauchi | F25B 39/022 165/153 |
| 4,915,165 | A * | 4/1990 | Dahlgren | F28F 3/046 165/166 |
| 5,628,206 | A * | 5/1997 | Baba | B60H 1/3227 165/76 |
| 5,727,623 | A * | 3/1998 | Yoshioka | F28D 9/0012 165/113 |
| 5,832,989 | A * | 11/1998 | Osakabe | F28D 15/0266 165/104.33 |
| 6,119,767 | A * | 9/2000 | Kadota | F28D 15/0233 165/104.33 |
| 6,257,324 | B1 * | 7/2001 | Osakabe | F28D 15/0266 165/104.33 |
| 6,279,649 | B1 * | 8/2001 | Osakabe | F28D 15/0266 165/104.21 |
| 6,357,517 | B1 * | 3/2002 | Osakabe | H01L 23/427 165/104.21 |
| 6,561,262 | B1 * | 5/2003 | Osakabe | F28D 15/0266 165/104.21 |
| 6,695,039 | B1 * | 2/2004 | Reyzin | F28D 15/02 165/104.21 |
| 6,808,015 | B2 * | 10/2004 | Osakabe | F28D 15/0233 165/104.21 |
| 6,832,647 | B2 * | 12/2004 | Voss | H01M 8/04007 165/111 |
| 6,875,247 | B2 * | 4/2005 | TeGrotenhuis | B01B 1/005 165/60 |
| 7,360,373 | B2 * | 4/2008 | Yamamoto | B60H 1/00335 62/244 |
| 7,762,090 | B2 * | 7/2010 | Lee | B01D 5/0072 62/93 |
| 8,899,062 | B2 * | 12/2014 | Kadle | F25B 1/00 62/333 |
| 8,925,624 | B2 * | 1/2015 | Kuroyanagi | F28F 9/026 165/157 |
| 9,163,607 | B2 * | 10/2015 | Tabe | F03D 9/10 |
| 9,267,741 | B2 * | 2/2016 | Mogilevsky | F28F 13/06 |
| 9,417,012 | B2 * | 8/2016 | Reinke | F01N 3/0234 |
| 9,581,367 | B2 * | 2/2017 | Mann | F25B 39/00 |
| 9,851,154 | B2 * | 12/2017 | Kim | F28D 9/005 |
| 10,054,371 | B2 * | 8/2018 | Espersen | F28D 15/025 |
| 10,228,192 | B2 * | 3/2019 | Ariyama | F28D 9/005 |
| 10,234,211 | B2 * | 3/2019 | Ariyama | F28F 3/044 |
| 10,449,832 | B2 * | 10/2019 | Lee | B60H 1/00342 |
| 10,697,354 | B2 * | 6/2020 | Oh | F28F 9/0075 |
| 2002/0104645 | A1 * | 8/2002 | Yoshida | F28D 9/0075 165/166 |
| 2005/0120715 | A1 * | 6/2005 | Labrador | F02C 1/05 60/618 |
| 2005/0284157 | A1 * | 12/2005 | Fijas | B01D 53/265 62/93 |
| 2006/0213651 | A1 * | 9/2006 | Higashiyama | F28F 9/0278 165/174 |
| 2006/0219394 | A1 * | 10/2006 | Martin | F28F 3/025 165/157 |
| 2006/0236538 | A1 * | 10/2006 | Nakagawa | F28F 21/084 29/890.03 |
| 2007/0130990 | A1 * | 6/2007 | Bellemo | F28F 3/027 62/515 |
| 2007/0193732 | A1 * | 8/2007 | Oofune | F28D 9/0031 165/164 |
| 2007/0221181 | A1 * | 9/2007 | Maucher | F02M 26/50 123/568.12 |
| 2007/0261400 | A1 * | 11/2007 | Digele | F02B 29/0431 60/320 |
| 2007/0267169 | A1 * | 11/2007 | Acre | F28D 9/0093 165/42 |
| 2008/0110595 | A1 * | 5/2008 | Palanchon | F28F 9/0219 165/103 |
| 2008/0115922 | A1 * | 5/2008 | Horek | F28D 9/00 165/240 |
| 2008/0169093 | A1 * | 7/2008 | Ohfune | F02M 26/11 165/164 |
| 2008/0202735 | A1 * | 8/2008 | Geskes | F28D 9/0043 165/166 |
| 2012/0216562 | A1 | 8/2012 | Kadle et al. | |
| 2012/0247145 | A1 * | 10/2012 | Denoual | F28F 9/001 62/498 |
| 2014/0102682 | A1 | 4/2014 | Kim et al. | |
| 2015/0276320 | A1 | 10/2015 | Mueller | |
| 2015/0338168 | A1 * | 11/2015 | Yoshioka | F28D 7/0066 165/104.21 |
| 2020/0408475 | A1 * | 12/2020 | Sun | F24H 4/02 |

\* cited by examiner

VEHICLE CONDENSER

TECHNICAL FIELD

The present invention relates to a vehicle condenser having a substantially parellelepipedic shape and comprising stacked plates, which are parallel to a substantially vertical plane and define alternate coolant chambers and refrigerant chambers between each other, wherein the vehicle condenser is divided into three consecutive groups of refrigerant chambers, of which a first group of refrigerant chambers is for precooling of a refrigerant in a substantially gaseous state, a second group of refrigerant chambers is for condensing of the refrigerant from a substantially gaseous state to a substantially liquid state, and a third group of refrigerant chambers is for sub cooling of the refrigerant in a substantially liquid state, and wherein each group of refrigerant chambers defines at least one refrigerant pass, in which refrigerant passes in a principal direction of flow through refrigerant chambers between opposing sides of the vehicle condenser.

BACKGROUND OF THE INVENTION

Rankine cycles driven by exhaust gases or recycled exhaust gases can be used in vehicles to reduce the fuel consumption and the emission of $CO_2$. If a Rankine system is properly designed, most of the heat in the exhaust gases can be recovered. In the Rankine cycle a refrigerant is brought from liquid to gas phase in an evaporator in a high pressure state and heat is exchanged from a heat source. Gas is expanded from high pressure to low pressure in an expander and useful work is extracted from the cycle. The gas is condensed at low pressure in a condenser and heat is exchanged towards a heat sink. In a vehicle the heat sink is a low temperature radiator system. The formed fluid can after condensation be gathered in a tank and pumped to a high pressure level and fed to the evaporator again to form a closed cycle.

The disclosure particularly relates to condensers for vehicles, which are built as plate heat exchangers with fluid circuits that are integrated in plate bundles.

OBJECT OF THE INVENTION

When a condenser is mounted in a vehicle, when the vehicle is moving the performance of the condenser is besides gravity also affected by other forces, such as forces related to turning of the vehicle, acceleration, deceleration, road conditions, road gradient etc. It has been found that in a condenser with plates stacked with a substantially vertical orientation, these forces tend to have less impact on the performance of the condenser than in a condenser with plates stacked with a substantially horizontal orientation. Hence, condensers with substantially vertically oriented stacked plates are more suitable for vehicles. However, in such condensers there can be a problem with accumulation of a refrigerant in a gaseous or liquid phase inside the condenser which affects heat transfer. Therefore, there is a need for further technical development aiming to increase performance of condensers with substantially vertically oriented stacked plates.

Against that background, it is an object of the present invention to alleviate or eliminate the drawbacks of vehicle condensers with substantially vertically oriented stacked plates.

SUMMARY OF THE INVENTION

In a vehicle condenser according to the preamble this object is achieved in that the vehicle condenser comprises at least one combination, on one side of the vehicle condenser, of a larger refrigerant outlet, that leads a main flow of refrigerant from one group of refrigerant chambers to a larger refrigerant inlet of a following group of refrigerant chambers, and, substantially vertically opposite to said larger refrigerant outlet, a smaller refrigerant outlet, that leads a residual flow of refrigerant from said one group of refrigerant chambers to a smaller refrigerant inlet of said following group of refrigerant chambers.

By means of the auxiliary smaller refrigerant outlet, depending on position thereof, residual refrigerant can be evacuated in either a gaseous (high positioned smaller refrigerant outlet) or liquid state (low positioned smaller refrigerant outlet) from one group of refrigerant chambers to a next group of refrigerant chambers. By this efficiency of the condenser is improved as refrigerant no longer can accumulate inside the condenser due to phase conflicts.

Preferably, a larger refrigerant outlet has an area 4-300 times as large as a smaller refrigerant outlet. The difference in size is important to promote refrigerant flow along an intended path through the vehicle condenser.

Preferably, a smaller refrigerant outlet taper towards a following group of refrigerant chambers in order to promote a direction of flow and thus again to promote refrigerant flow along an intended path through the vehicle condenser.

Preferably, each group of refrigerant chambers defines just one refrigerant pass, wherein, according to a first alternative that enables a compact design, refrigerant chambers of the first group comprise interconnected larger refrigerant inlets at a bottom corner of the vehicle condenser and interconnected larger refrigerant outlets at a diagonally opposite top corner of the vehicle condenser, wherein refrigerant chambers of the second group comprise interconnected larger refrigerant inlets in line with and connected to the refrigerant outlets of the first group of refrigerant chambers and interconnected larger refrigerant outlets in line with but separate from the larger refrigerant inlets of the first group of refrigerant chambers, and wherein refrigerant chambers of the third group comprise interconnected larger refrigerant inlets in line with and connected to the larger refrigerant outlets of the third group of refrigerant chambers and interconnected larger refrigerant outlets in line with but separate from the larger refrigerant outlets of the first group of refrigerant chambers.

According to a second alternative that enables a compact design, each group of refrigerant chambers defines just one refrigerant pass, wherein refrigerant chambers of the first group comprise interconnected larger refrigerant inlets at a top corner of the vehicle condenser and interconnected larger refrigerant outlets at a diagonally opposite bottom corner of the vehicle condenser, wherein refrigerant chambers of the second group comprise interconnected larger refrigerant inlets in line with and connected to the larger refrigerant outlets of the first group of refrigerant chambers and interconnected larger refrigerant outlets in line with the larger refrigerant inlets of the first group of refrigerant chambers, and wherein refrigerant chambers of the third group comprise interconnected larger refrigerant inlets in line with and connected to the larger refrigerant outlets of the third group of refrigerant chambers and interconnected larger refrigerant outlets in line with the larger refrigerant outlets of the first group of refrigerant chambers.

According to a third alternative that enables a compact design, each group of refrigerant chambers defines just one refrigerant pass, wherein refrigerant chambers of the first group comprise interconnected larger refrigerant inlets at a first top corner of the vehicle condenser and interconnected larger refrigerant outlets at a horizontally opposite second top corner of the vehicle condenser, wherein refrigerant chambers of the second group comprise interconnected larger refrigerant inlets in line with and connected to the larger refrigerant outlets of the first group of refrigerant chambers and interconnected larger refrigerant outlets in line with the larger refrigerant inlets of the first group of refrigerant chambers, and wherein refrigerant chambers of the third group comprise interconnected larger refrigerant inlets in line with and connected to the larger refrigerant outlets of the third group of refrigerant chambers and interconnected larger refrigerant outlets in line with the larger refrigerant outlets of the first group of refrigerant chambers.

According to a fourth alternative that enables a compact design, each group of refrigerant chambers defines just one refrigerant pass, wherein refrigerant chambers of the first group comprise interconnected larger refrigerant inlets at a first bottom corner of the vehicle condenser and interconnected larger refrigerant outlets at a horizontally opposite second bottom corner of the vehicle condenser, wherein refrigerant chambers of the second group comprise interconnected larger refrigerant inlets in line with and connected to the larger refrigerant outlets of the first group of refrigerant chambers and interconnected larger refrigerant outlets in line with the larger refrigerant inlets of the first group of refrigerant chambers, and wherein refrigerant chambers of the third group comprise interconnected larger refrigerant inlets in line with and connected to the larger refrigerant outlets of the third group of refrigerant chambers and interconnected larger refrigerant outlets in line with the larger refrigerant outlets of the first group of refrigerant chambers.

Preferably, in the four alternatives each coolant chamber comprises a coolant inlet arranged at a corner of the vehicle condenser not occupied by larger refrigerant inlets or outlets, and a coolant outlet arranged at an opposite corner of the vehicle condenser not occupied by larger refrigerant inlets or outlets. By this compact design is promoted, too.

Preferably and also to promote compact design, said smaller refrigerant outlet of the combination according to the invention is arranged close to a coolant inlet or coolant outlet.

Preferably, said alternate coolant chambers and refrigerant chambers each comprise at least one insert, which, on one side of the vehicle condenser, is arranged between and is sealingly connected to two adjacent plates. The inserts render it possible to easily provide for intended flow paths inside the vehicle condenser.

Preferably, an insert arranged in a refrigerant chamber comprises a coolant port, which is aligned with a coolant inlet or a coolant outlet of an adjacent coolant chamber. By this a coolant passage through the refrigerant chamber can be easily created.

Preferably, an insert arranged in a coolant chamber comprises a larger refrigerant port, which is aligned with a larger refrigerant inlet or a larger refrigerant outlet of an adjacent refrigerant chamber. By this a refrigerant passage through the coolant chamber can be easily created.

Preferably, an insert arranged in a coolant chamber comprises a smaller refrigerant port, which is aligned with a smaller refrigerant inlet or outlet of an adjacent refrigerant chamber. By this the necessary ports can be easily created.

It is possible to provide an insert arranged in a coolant chamber with a solid portion, which blocks a larger refrigerant inlet or outlet of an adjacent refrigerant chamber. By this it is possible to redirect refrigerant flow in an easy way.

Preferably, an insert arranged in a coolant chamber comprises a solid portion, which blocks a smaller refrigerant inlet or outlet of an adjacent refrigerant chamber. By this it is possible to control residual refrigerant flow in an easy way.

According to one alternative, said alternate coolant chambers and refrigerant chambers defined between stacked plates are further defined by means of circumferential plate rims, each reaching over to and being sealingly connected to an adjacent plate. This alternative appears at present to be the most convenient one for large series of vehicle condensers.

According to another alternative, said alternate coolant chambers and refrigerant chambers defined between stacked plates are further defined by means of circumferential frames, each being arranged between and being sealingly connected to two adjacent plates, wherein, preferably, said at least one insert forms an integral part of a circumferential frame. This alternative appears at present to be the most convenient one for small series of vehicle condensers.

BRIEF DESCRIPTION OF THE DRAWINGS

The above, as well as additional objects, features and other advantages of the present invention, will be better understood through the following illustrative and non-limiting description of currently preferred embodiments of the present invention, with reference to the appended schematic drawings, where the same reference numerals are used for similar elements.

DETAILED DESCRIPTION OF PREFERRED EMBODIMENTS

In the following different ways to design a vehicle condenser 10 according to preferred embodiments of the invention will be described.

Figure 1:
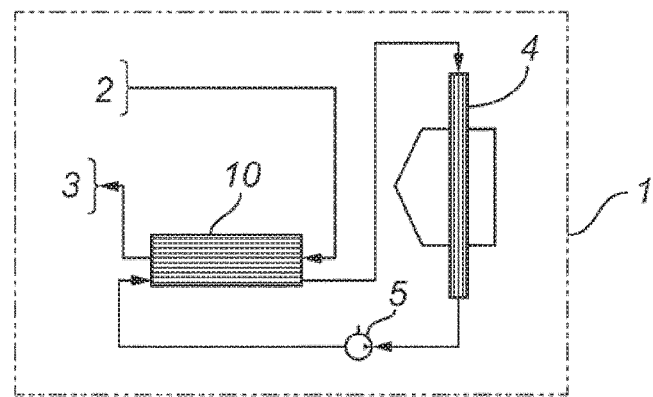
FIG. 1 is a view schematically illustrating a vehicle comprising a vehicle condenser according to the invention.

According to the invention the vehicle condenser is designed to be used in a vehicle, which is schematically illustrated in FIG. 1 by means of a dash lined rectangle 1. It comprises some sort of engine connected to a waste heat recovery system of the well-known Rankine type. The waste heat recovery system comprises at least one high pressure evaporator, which after heating, e.g. by exhaust gas from the engine, outputs a refrigerant in a gaseous state at high pressure, and, after cooling, receives the refrigerant in a liquid state at low pressure, while useful work is extracted on the way, e.g. by means of a turbine driven by the refrigerant. In FIG. 1 a top brace 2 illustrates an output from the high pressure evaporator after extraction of work, whereas a bottom brace 3 illustrates the input to the high pressure evaporator.

Shown too in FIG. 1 is an air cooled coolant radiator 4, which cools coolant from the vehicle condenser 10, the coolant being circulated by means of a pump 5.

Figure 2:
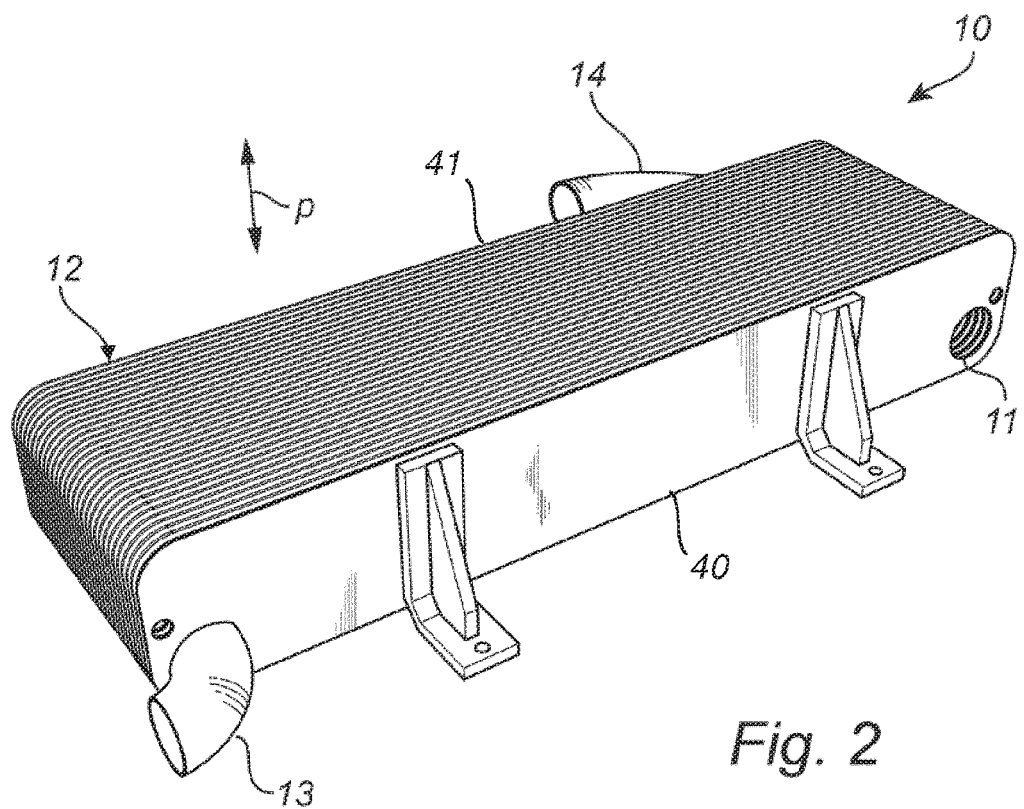
FIG. 2 is an isometric view of a vehicle condenser according to a first embodiment of the invention.

A first version of the vehicle condenser 10 according to a preferred embodiment of the invention is shown in FIG. 2. It has a substantially parellelepipedic shape and comprises a number of stacked plates (described below in detail), which are parallel to a substantially vertical plane illustrated by arrow p, and define alternate coolant chambers and refrigerant chambers. The vehicle condenser 10 comprises a refrigerant inlet 11, connected to the above output 2, in a front plate 40 at a front right bottom corner, a refrigerant outlet (hidden, cf. arrow 12), connected to the above input 3, in a rear plate 41 at a rear left top corner, a coolant inlet 13, connected to pump 5, in the front plate 40 at a front left bottom corner, and coolant outlet 14, connected to coolant radiator 4, in the rear plate 41 at a rear right top corner.

Figure 3:
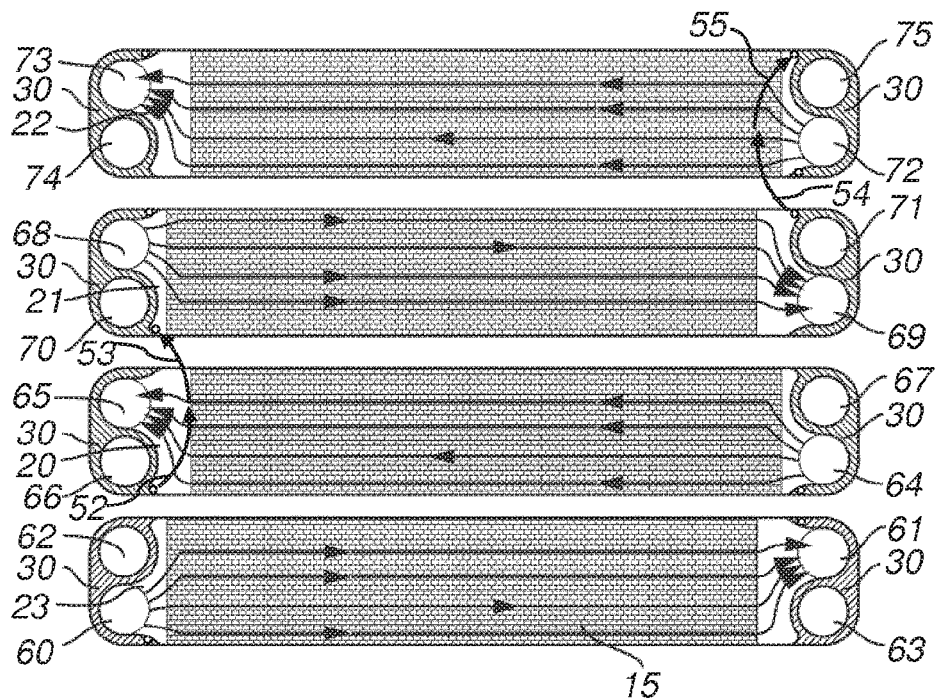
FIG. 3 is a plan view illustrating flow through different chambers of the vehicle condenser according to the first embodiment.
Figure 4:
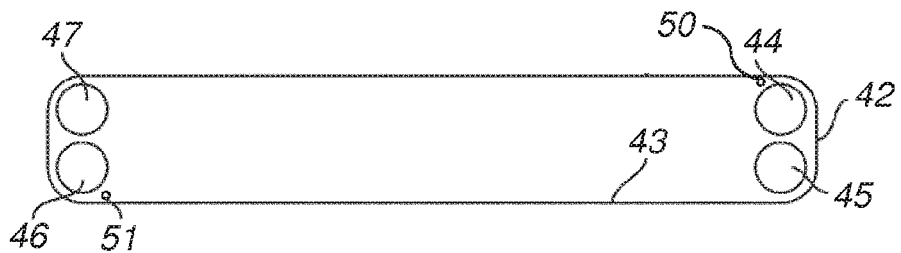
FIG. 4 is a plan view illustrating a first type of plate for the vehicle condenser according to the first embodiment.

In FIG. 3 flow of refrigerant and coolant is illustrated by means of multiple arrows in three different groups of refrigerant chambers 20, 21, 22 as well as in a coolant chamber 23. In FIG. 3 each of the four views in the background shows a plate 42 according to FIG. 4. Each plate 42 is tray shaped and comprises a circumferential rim 43, which in a known manner is to be tightly connected with an adjacent plate in order to define a chamber in between. Each plate 42 does also comprise four large holes 44, 45, 46 and 47, each in line with a refrigerant inlet or outlet 11 or 12 or a coolant inlet or outlet 13, 14 of FIG. 2. Further, each plate 42 comprises two small holes 50, 51, in FIG. 4 arranged at a right top corner close to large hole 44 and at a left bottom corner close to large hole 46. Their function will be described below.

Figure 6:
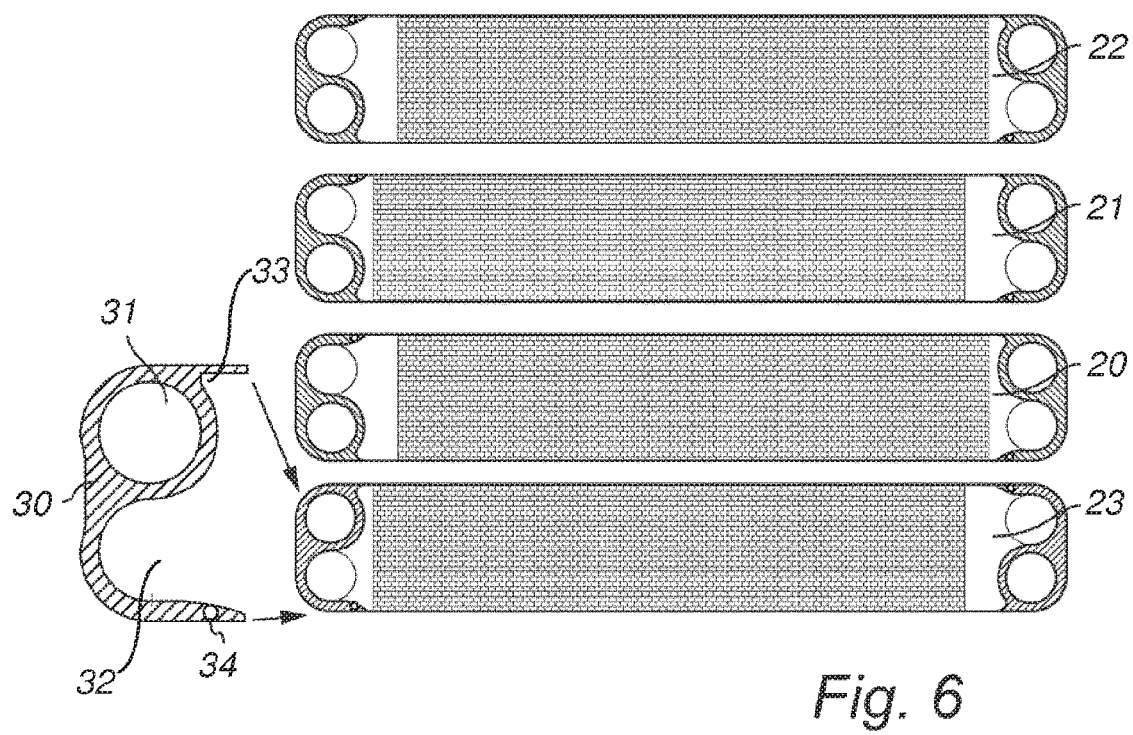
FIG. 6 is a plan view illustrating use of a first type of insert in the vehicle condenser according to the first embodiment.

Further shown in FIG. 3 is that, in a well-known manner, turbulators 15 are arranged in each chamber 20-23 in order to improve heat exchange. Also arranged in each chamber 20-23 is an insert 30 at each short side. An insert 30 of FIG. 3 is shown in greater detail in FIG. 6. It has a size and a height fitting the respective chamber 20-23 at the place where it is mounted, preferably by brazing. It comprises an enclosed large port 31, corresponding to a respective large hole 44-47 of the plates, and a large recess 32, corresponding to another respective large hole 44-47. Further, on the side of the large port 31 the insert 30 comprises a small recess 33, which corresponds to one of said small holes 50, 51 if the insert 30 is turned appropriately, and on the side of the large recess 32 the insert 30 comprises a minor port 34, which corresponds to one of said small holes 50, 51 if the insert 30 is turned appropriately.

Now, back to FIG. 3, where it is shown that inserts 30 can be mounted differently on plates 40 in order to provide different flow paths in different chambers 20-23. Starting at the bottom, chamber 23 illustrates one of a plurality of coolant chambers interleaved with the remaining chambers 20-22. The bottom left large hole 46 (cf. FIG. 4) of its background plate 42 forms a coolant inlet 60 and the top right large hole 44 (cf. FIG. 4) in its background plate 42 forms a coolant outlet 61, both arranged in a recess 32 (cf. FIG. 6) of an insert 30. The top left large hole 47 (cf. FIG. 4) in its background plate 42 and the bottom right large hole 45 (cf. FIG. 4) in its background plate 42 form refrigerant throughputs 62, 63. These are tightly enclosed by one large port 31 (cf. FIG. 6) each of an appropriately turned insert 30. Configured in that way, coolant is lead from the coolant inlet 13 (cf. FIG. 2) through each coolant chamber 23 in a side to side manner from a left bottom corner to a right top corner in order to finally exit at the coolant outlet 14 (cf. FIG. 2).

The next chamber from the bottom in FIG. 3, is one of a first group of a plurality of refrigerant chambers 20 which are interleaved with a number of coolant chambers 23. Here the bottom right large hole 45 (cf. FIG. 4) of plate 42 forms a refrigerant inlet 64 and the top left large hole 47 (cf. FIG. 4) in plate 42 forms a refrigerant outlet 65, both arranged in a large recess 32 of an appropriately turned insert 30 (cf. FIG. 6). The top right large hole 44 (cf. FIG. 4) in plate 42 and the bottom left large hole 46 (cf. FIG. 4) in plate 42 form coolant throughputs 66, 67, which are connected to coolant input 60 and coolant output 61, respectively, and are enclosed by one large port 31 (cf. FIG. 6) each of an insert 30. Configured in that way, refrigerant is lead from the refrigerant inlet 11 (cf. FIG. 2) through each refrigerant chamber 20 of the first group in a side to side manner from a right bottom corner to a left top corner in order to finally exit to a second group of refrigerant chambers 21.

The next chamber from the bottom in FIG. 3, is one of a second group of refrigerant chambers 21 which again are interleaved with a number of coolant chambers 23. Here the top left large hole 47 (cf. FIG. 4) of plate 42 forms a refrigerant inlet 68 and the bottom right large hole 45 (cf. FIG. 4) in plate 42 forms a refrigerant outlet 69, both arranged in a large recess 32 of an appropriately turned insert 30. The top right large hole 44 (cf. FIG. 4) in plate 42 and the bottom left large hole 46 (cf. FIG. 4) in plate 42 form coolant throughputs 70, 71, which are connected to coolant input 60 and coolant output 61, respectively, and are enclosed by one large port 31 (cf. FIG. 6) each of an insert 30 (cf. FIG. 6). Configured in that way, refrigerant is lead from the refrigerant outlet 65 through each refrigerant chamber 21 of the second group in a side to side manner from a left top corner to a right bottom corner in order to finally exit to a third group of refrigerant chambers 22.

The top chamber in FIG. 3, is one of a third group of refrigerant chambers 22 which are interleaved with a number of coolant chambers 23. Here the bottom right large hole 45 (cf. FIG. 4) of plate 42 forms a refrigerant inlet 72 and the top left large hole 47 cf. FIG. 4) in plate 42 forms a refrigerant outlet 73, both arranged in a large recess 32 of an appropriately turned insert 30 (cf. FIG. 6). The top right large hole 44 (cf. FIG. 4) in plate 42 and the bottom left large hole 46 (cf. FIG. 4) in plate 19 form coolant throughputs 74, 75, which are connected to coolant input 60 and coolant output 61, respectively, and are enclosed by one large port 31 (cf. FIG. 6) each of an insert 30. Configured in that way, refrigerant is lead from the refrigerant outlet 69 through each refrigerant chamber 22 of the third group in a side to side manner from a right bottom corner to a left top corner in order to finally exit at the refrigerant exit 12 (FIG. 2).

Figure 5:
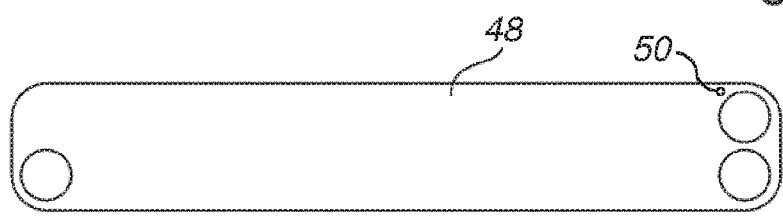
FIG. 5 is a plan view illustrating a second type of plate for the vehicle condenser according to the first embodiment.

In order to render change of flow direction possible between refrigerant chambers 20 and 21, and 21 and 22, respectively, two different approaches are possible for the above solution. The first is to use a different plate than plate 42 described above. The alternative plate is illustrated in FIG. 5, is enumerated 48 and resembles plate 42 in all respects except for missing top left large hole 47 and bottom left small hole 51 of FIG. 4. The missing large hole 47 blocks through flow. Thus, when plate 48 is used as an interface between different groups of refrigerant chambers 20-22, the flow direction of the refrigerant changes as wanted.

Figure 7:
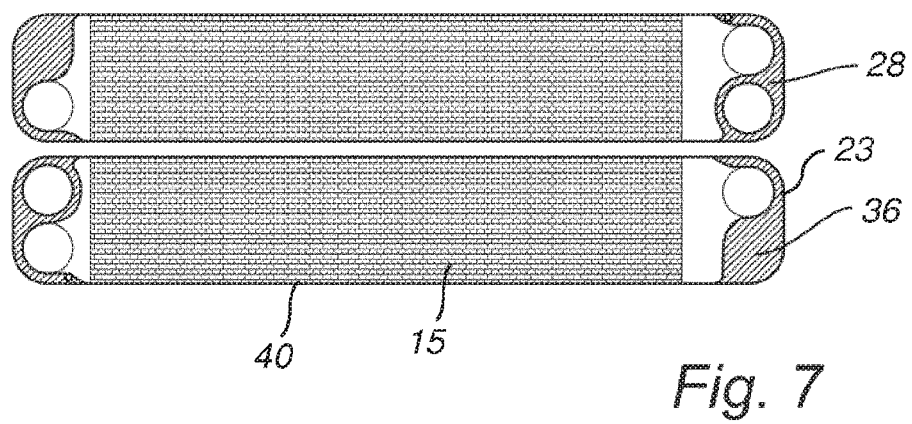
FIG. 7 is a plan view illustrating use of a second type of insert in the vehicle condenser according to the first embodiment.
Figure 8:
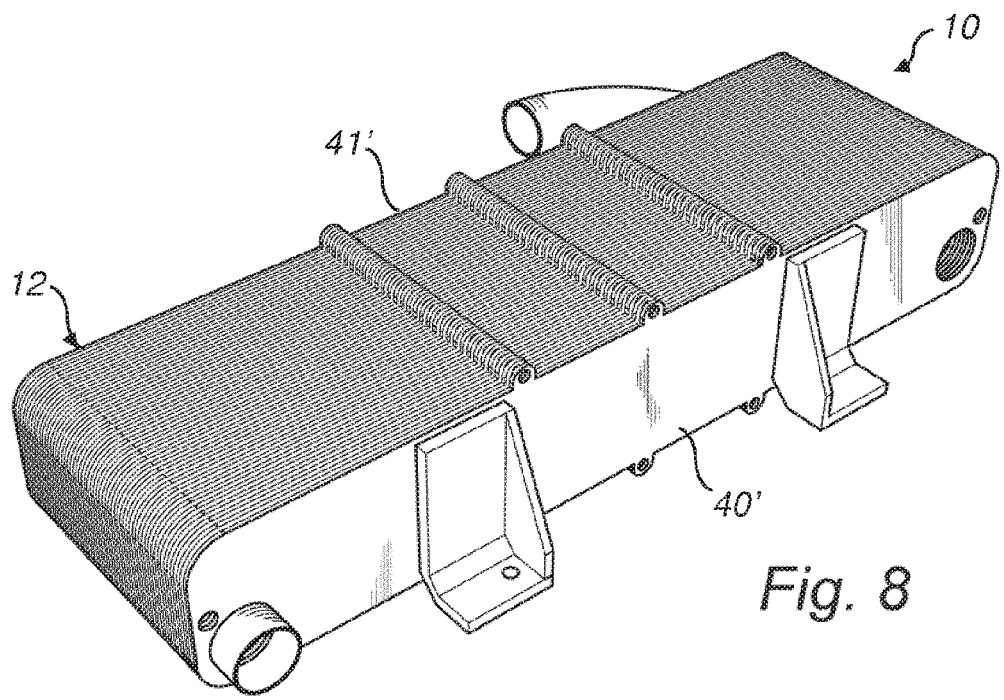
FIG. 8 is an isometric view of a vehicle condenser according to a second embodiment of the invention.

The second way to change flow direction is to use all alike plates 42, but instead to use different inserts. This is illustrated in FIG. 7, where inserts 30 according to the above are used as well as alternative inserts 35. The latter do not comprise any large port 31 but a solid portion 36 instead, which is why they if used in a coolant chamber 23 and are turned appropriately can block flow just as the alternative plates 48.

The number of refrigerant chambers 20 pertaining to the first group is larger than the number of refrigerant chambers 21 pertaining to the second group, and the number of refrigerant chambers 21 pertaining to the second group is larger than the number of refrigerant chambers 22 pertaining to the third group. The cause for this is that the refrigerant is intended to reach the condenser 10 in a gaseous state and to leave it in a liquid state, in which the refrigerant requires far less space than in the gaseous state. Further, in between the gaseous and the liquid state there is kind of a mixed state, in which the refrigerant requires less space than in the gaseous state but more space than in the liquid state. Hence, in order to maintain an optimum through flow, a gradual reduction of the number of refrigerant chambers 20-22 pertaining to the three different groups has proven to work very well.

A problem that arises with the layout chosen according to the preferred embodiment of the invention is that there can be a tendency for liquid refrigerant to gather in bottom parts of refrigerant chambers 20, since they lack a bottom refrigerant outlet, and of gaseous refrigerant to gather in top parts of refrigerant chambers 21, since they lack a top refrigerant outlet. If too much refrigerant is gathered, whether gaseous or liquid, performance of the condenser is lowered severely. To remedy this, according to the preferred embodiment of the invention the above small holes 50 and 51 in plates 42 and 48 and/or small recesses 33 and minor ports 34 in inserts 30 come into play. If aligned and used in a bottom region of the condenser 10, they form drainage openings, though which accumulated liquid refrigerant can escape from refrigerant chambers 20 of the first group of to the second group of refrigerant chambers 21, as illustrated in FIG. 3 by means of a curved outbound arrow 52 and a curved inbound arrow 53. And if aligned and used in a top region of the condenser 10, they form de-aeration openings, though which accumulated gaseous refrigerant can escape from refrigerant chambers 16 of the second group to the third group of refrigerant chambers 17, as illustrated in FIG. 3 by means of a curved outbound arrow 54 and a curved inbound arrow 55. It is, however, important keep size of the small holes 50 and 51 down to a level that does not compromise refrigerant flow at large.

In FIGS. 8-12 a second embodiment of the vehicle condenser 10 according to the invention is illustrated. Basically the second embodiment differs from the first only in that plates and inserts look differently. Hence, only these will be described in short below and enumerated differently only where deemed necessary to point at major differences.

Figure 9:
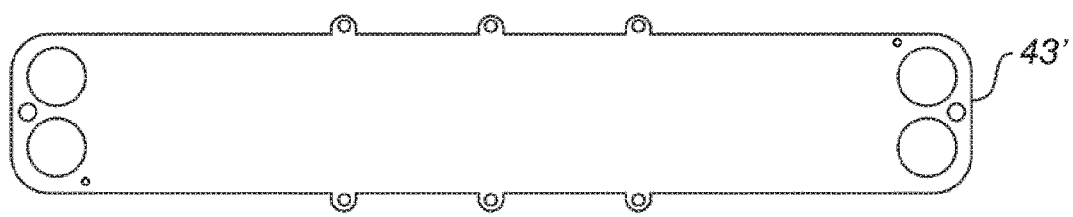
FIG. 9 is a plan view illustrating a first type of plate for the vehicle condenser according to the second embodiment.
Figure 10:
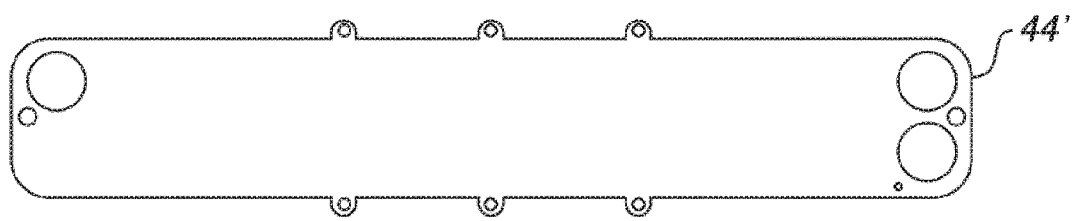
FIG. 10 is a plan view illustrating a second type of plate for the vehicle condenser according to the second embodiment.
Figure 11:
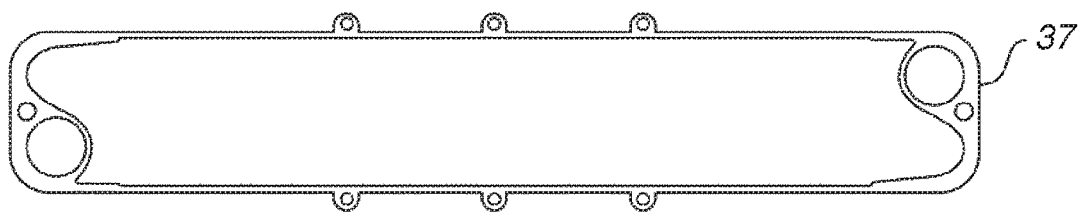
FIG. 11 is a plan view illustrating a first type of circumferential frame for the vehicle condenser according to the second embodiment.
Figure 12:
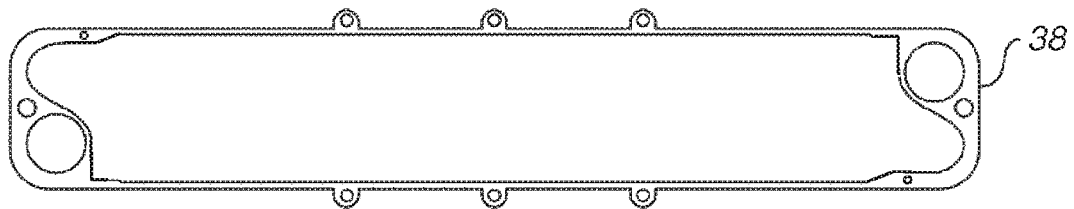
FIG. 12 is a plan view illustrating a second type of circumferential frame for the vehicle condenser according to the second embodiment.

As before and as shown in FIGS. 9 and 10 there are two different types of plates 42', 48' besides a front plate 40' and rear plate 41'. Contrary to the previous plates, plates 40', 41', 42' and 48' are all flat. This means they cannot themselves define any coolant or refrigerant chambers. According to the second embodiment this problem is solved by means of another type of insert 37, 38, shown in FIGS. 11 and 12. They differ from the previous inserts primarily in that they comprise a circumferential frame that binds two opposite insert portions together. The frame inserts 37, 38 are used to enclose the refrigerant and coolant chambers, respectively.

The invention described so far concerns a vehicle condenser for a waste heat recovery system. It is, however, possible to use the vehicle condenser for other vehicle purposes as well, such as a condenser of an air conditioning system.

What is claimed is:

1. A vehicle condenser having a substantially parellelepipedic shape, the vehicle condenser comprising:
    stacked plates which are parallel to a substantially vertical plane (p) and define alternate coolant chambers and refrigerant chambers between each other;
    wherein the vehicle condenser is divided into three consecutive groups of refrigerant chambers including:
        a first group of refrigerant chambers for precooling a refrigerant in a substantially gaseous state,
        a second group of refrigerant chambers for condensing the refrigerant from a substantially gaseous state to a substantially liquid state, and
        a third group of refrigerant chambers for subcooling the refrigerant in a substantially liquid state,
    wherein each group of the three consecutive groups of the refrigerant chambers define at least one refrigerant pass in which refrigerant passes in a principal direction of flow through the three consecutive groups of the refrigerant chambers between opposing sides of the vehicle condenser,
    wherein the vehicle condenser further includes:
        on one side of the vehicle condenser, a first refrigerant outlet that leads a main flow of refrigerant from one group of refrigerant chambers to a first refrigerant inlet of a following group of refrigerant chambers; and
        substantially vertically opposite to the first refrigerant outlet, a second refrigerant outlet that leads a residual flow of refrigerant from the one group of refrigerant chambers to a second refrigerant inlet of the following group of refrigerant chambers;
        wherein a cross-sectional area of the second refrigerant outlet is smaller than a cross-sectional area of the first refrigerant outlet, and
        wherein a cross-sectional area of the second refrigerant inlet is smaller than a cross-sectional area of the first refrigerant inlet.

2. The vehicle condenser according to claim 1, wherein the cross-sectional area of the first refrigerant outlet is four through three hundred times as large as the cross-sectional area of the second refrigerant outlet.

3. The vehicle condenser according to claim 1, wherein the second refrigerant outlet tapers towards the following group of refrigerant chambers in order to promote a direction of flow.

4. The vehicle condenser according to claim 1, wherein each group of refrigerant chambers defines one refrigerant pass,
wherein refrigerant chambers of the first group of refrigerant chambers comprise:
interconnected first refrigerant inlets at a bottom corner of the vehicle condenser, and
interconnected first refrigerant outlets at a diagonally opposite top corner of the vehicle condenser,
wherein refrigerant chambers of the second group of refrigerant chambers comprise:
interconnected second refrigerant inlets in line with and connected to the first refrigerant outlets of the first group of refrigerant chambers, and
interconnected second refrigerant outlets in line with but separate from the first refrigerant inlets of the first group of refrigerant chambers, and
wherein refrigerant chambers of the third group of refrigerant chambers comprise:
interconnected third refrigerant inlets in line with and connected to the second refrigerant outlets of the second group of refrigerant chambers, and
interconnected third refrigerant outlets in line with but separate from the first refrigerant outlets of the first group of refrigerant chambers.

5. The vehicle condenser according to claim 1, wherein each group of refrigerant chambers defines one refrigerant pass,
wherein refrigerant chambers of the first group of refrigerant chambers comprise:
interconnected first refrigerant inlets at a top corner of the vehicle condenser, and
interconnected first refrigerant outlets at a diagonally opposite bottom corner of the vehicle condenser,
wherein refrigerant chambers of the second group of refrigerant chambers comprise:
interconnected second refrigerant inlets in line with and connected to the first refrigerant outlets of the first group of refrigerant chambers, and
interconnected second refrigerant outlets in line with but separate from the first refrigerant inlets of the first group of refrigerant chambers, and
wherein refrigerant chambers of the third group of refrigerant chambers comprise:
interconnected third refrigerant inlets in line with and connected to the second refrigerant outlets of the second group of refrigerant chambers, and
interconnected third refrigerant outlets in line with but separate from the first refrigerant outlets of the first group of refrigerant chambers.

6. The vehicle condenser according to claim 1, wherein each group of refrigerant chambers defines one refrigerant pass,
wherein refrigerant chambers of the first group of refrigerant chambers comprise:
interconnected first refrigerant inlets at a first top corner of the vehicle condenser, and
interconnected first refrigerant outlets at a horizontally opposite second top corner of the vehicle condenser,
wherein refrigerant chambers of the second group of refrigerant chambers comprise:
interconnected second refrigerant inlets in line with and connected to the first refrigerant outlets of the first group of refrigerant chambers, and
interconnected second refrigerant outlets in line with but separate from the first refrigerant inlets of the first group of refrigerant chambers, and
wherein refrigerant chambers of the third group of refrigerant chambers comprise:
interconnected third refrigerant inlets in line with and connected to the second refrigerant outlets of the second group of refrigerant chambers, and
interconnected outlets in line with but separate from the first refrigerant outlets of the first group of refrigerant chambers.

7. The vehicle condenser according to claim 1, wherein each group of refrigerant chambers defines one refrigerant pass,
wherein refrigerant chambers of the first group of refrigerant chambers comprise:
interconnected first refrigerant inlets at a first bottom corner of the vehicle condenser, and
interconnected first refrigerant outlets at a horizontally opposite second bottom corner of the vehicle condenser,
wherein refrigerant chambers of the second group of refrigerant chambers comprise:
interconnected second refrigerant inlets in line with and connected to the first refrigerant outlets of the first group of refrigerant chambers, and
interconnected second refrigerant outlets in line with but separate from the first refrigerant inlets of the first group of refrigerant chambers, and
wherein refrigerant chambers of the third group of refrigerant chambers comprise:
interconnected third refrigerant inlets in line with and connected to the second refrigerant outlets of the second group of refrigerant chambers, and
interconnected third outlets in line with but separate from the first refrigerant outlets of the first group of refrigerant chambers.

8. The vehicle condenser according to claim 7, wherein refrigerant outlets are arranged at a corner of the vehicle condenser not occupied by refrigerant inlets or outlets or a coolant outlet arranged at an opposite corner of the vehicle condenser not occupied by refrigerant inlets or outlets.

9. The vehicle condenser according to claim 1, wherein each coolant chamber comprises a coolant inlet arranged at a corner of the vehicle condenser not occupied by the first refrigerant inlets or outlets, and a coolant outlet arranged at an opposite corner of the vehicle condenser not occupied by the first refrigerant inlets or outlets.

10. The vehicle condenser according to claim 1, wherein said alternate coolant chambers and refrigerant chambers each comprise at least one insert, which, on one side of the vehicle condenser, is arranged between and is sealingly connected to two adjacent plates.

11. The vehicle condenser according to claim 10, wherein an insert in a coolant chamber comprises a refrigerant port, which is aligned with a refrigerant inlet or outlet of an adjacent refrigerant chamber.

12. The vehicle condenser according to claim 10, wherein an insert in a coolant chamber comprises a refrigerant port, which is aligned with a refrigerant inlet or outlet of an adjacent refrigerant chamber.

13. The vehicle condenser according to claim 10, wherein an insert in a coolant chamber comprises a solid portion, which blocks a refrigerant inlet or outlet of an adjacent refrigerant chamber.

14. The vehicle condenser according to claim 10, wherein an insert in a coolant chamber comprises a solid portion, which blocks a refrigerant inlet or outlet of an adjacent refrigerant chamber.

15. The vehicle condenser according to claim 10, wherein said alternate coolant chambers and refrigerant chambers defined between stacked plates are further defined by circumferential plate rims, each reaching over to and being sealingly connected to an adjacent plate.

16. The vehicle condenser according to claim 10, wherein said alternate coolant chambers and refrigerant chambers defined between stacked plates are further defined by circumferential frames, each being arranged between and being sealingly connected to two adjacent plates.

17. The vehicle condenser according to claim 16, wherein said at least one insert forms an integral part of a circumferential frame.

18. The vehicle condenser according to claim 10, wherein an insert arranged in a refrigerant chamber comprises a coolant port, which is aligned with a coolant inlet or a coolant outlet of an adjacent coolant chamber.

19. The vehicle condenser according to claim 18, wherein an insert in a coolant chamber comprises a refrigerant port, which is aligned with a refrigerant inlet or outlet of an adjacent refrigerant chamber.

* * * * *